US012664827B2

(12) United States Patent
Otani et al.

(10) Patent No.: US 12,664,827 B2
(45) Date of Patent: Jun. 23, 2026

(54) FAILURE MANAGEMENT SYSTEM AND FAILURE MANAGEMENT METHOD

(71) Applicant: HONDA MOTOR CO., LTD., Tokyo (JP)

(72) Inventors: Kyohei Otani, Tokyo (JP); Takashi Tsujioka, Tokyo (JP); Tadahiko Kanoh, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 120 days.

(21) Appl. No.: 18/543,770

(22) Filed: Dec. 18, 2023

(65) Prior Publication Data

US 2024/0257580 A1 Aug. 1, 2024

(30) Foreign Application Priority Data

Jan. 26, 2023 (JP) ................................ 2023-010374

(51) Int. Cl.
*G07C 5/00* (2006.01)
*G07C 5/08* (2006.01)

(52) U.S. Cl.
CPC ........... *G07C 5/008* (2013.01); *G07C 5/0816* (2013.01)

(58) Field of Classification Search
CPC ..... G07C 5/008; G07C 5/0816; G07C 5/0808
USPC ........................................................ 701/31.4
See application file for complete search history.

(56) References Cited

U.S. PATENT DOCUMENTS

2006/0015231 A1* 1/2006 Yoshimura ............ B60L 3/0076 701/1
2011/0046842 A1* 2/2011 Smith .................... G07C 5/006 701/31.4
2013/0265431 A1 10/2013 Hattori et al.
2015/0061895 A1* 3/2015 Ricci ...................... G06V 40/28 340/902

(Continued)

FOREIGN PATENT DOCUMENTS

CN 105354492 A 2/2016
JP 2007-036935 A 2/2007

(Continued)

OTHER PUBLICATIONS

Chinese Office Action Corresponding to Application No. CN 202311810169.A, dated Apr. 21, 2026, 19 pages.

*Primary Examiner* — Vivek D Koppikar
*Assistant Examiner* — Dominick Mulder
(74) *Attorney, Agent, or Firm* — Rankin, Hill & Clark LLP

(57) ABSTRACT

A failure management device includes: an information collection unit configured to collect failure information which is information about a failure of devices or instruments loaded in a vehicle; a notification unit configured to output a failure notice notifying occurrence of the failure inside the vehicle; and an instruction unit configured to instruct the notification unit whether or not to output the failure notice when the failure of one of the devices or the instruments is found based on the failure information, and the instruction unit prohibits the notification unit from outputting the failure notice when the device or the instrument in which the failure is found is not involved in execution of an option function for which the execution is permitted, based on management information indicating whether or not the execution of the (Continued)

option function is permitted for each of the option functions in the vehicle.

4 Claims, 9 Drawing Sheets

(56) References Cited

U.S. PATENT DOCUMENTS

| | | | | |
|---|---|---|---|---|
| 2015/0160019 | A1* | 6/2015 | Biswal | G06Q 50/01 701/1 |
| 2017/0137008 | A1* | 5/2017 | Takase | B60T 13/142 |
| 2017/0270490 | A1* | 9/2017 | Penilla | G07C 5/0808 |
| 2019/0146484 | A1* | 5/2019 | Lin | H04L 67/125 701/2 |
| 2020/0216086 | A1* | 7/2020 | Lenke | B60W 50/08 |
| 2021/0092019 | A1* | 3/2021 | Fang | H04L 63/0236 |
| 2021/0362732 | A1 | 11/2021 | Sakurada et al. | |
| 2021/0379992 | A1* | 12/2021 | Domeyer | B60Q 1/2603 |
| 2021/0394775 | A1* | 12/2021 | Julian | G06V 20/58 |
| 2022/0051488 | A1* | 2/2022 | Brown | G05D 1/0022 |
| 2023/0032305 | A1* | 2/2023 | Krishnani | G06F 11/0772 |
| 2023/0062678 | A1* | 3/2023 | Aoki | B60W 30/095 |
| 2023/0161611 | A1* | 5/2023 | Damiani | B60K 35/10 715/708 |
| 2024/0242236 | A1* | 7/2024 | Lemieux | G06F 3/013 |

FOREIGN PATENT DOCUMENTS

| | | | |
|---|---|---|---|
| JP | 2020-117219 | A | 8/2020 |
| JP | 2021-189491 | A | 12/2021 |

* cited by examiner

FIG. 3

| USER ID | FUNCTION | EXECUTION PERMISSION/PROHIBITION | ASSOCIATED ECU | ASSOCIATED INSTRUMENT |
|---|---|---|---|---|
| U0001 | FUNCTION A | PERMITTED | aECU | INSTRUMENT a |
| | FUNCTION B | PROHIBITED | bECU | INSTRUMENT b |
| | FUNCTION C | PROHIBITED | cECU | INSTRUMENT c |
| | FUNCTION D | PERMITTED | dECU | INSTRUMENT d |
| | FUNCTION E | PROHIBITED | aECU、bECU | INSTRUMENT b |
| | FUNCTION F | PERMITTED | aECU、cECU | INSTRUMENT a, INSTRUMENT c |
| | FUNCTION G | PROHIBITED | aECU、dECU | INSTRUMENT a, INSTRUMENT d |
| | FUNCTION H | PROHIBITED | cECU、dECU | INSTRUMENT c, INSTRUMENT d |
| | FUNCTION J | PROHIBITED | aECU、bECU、dECU | INSTRUMENT a, INSTRUMENT b, INSTRUMENT d |
| | ... | ... | ... | ... |
| | ... | ... | ... | ... |
| | ... | ... | ... | ... |
| .... | .... | .... | .... | .... |

FAILURE MANAGEMENT SYSTEM AND FAILURE MANAGEMENT METHOD

INCORPORATION BY REFERENCE

The present application claims priority under 35 U.S.C. § 119 to Japanese Patent Application No. 2023-010374 filed on Jan. 26, 2023. The content of the application is incorporated herein by reference in its entirety.

BACKGROUND OF THE INVENTION

Field of the Invention

The present invention relates to a failure management system that manages a failure of an in-vehicle instrument, and a failure management method.

Description of the Related Art

An approach of providing access to a sustainable transportation system considering even vulnerable people among traffic participants is gaining momentum. Towards the realization, the focus is on research and development for further improving traffic safety and convenience through research and development regarding a driving assist technique.

Further, in recent years, devices and instruments capable of realizing option functions are loaded in a vehicle beforehand in addition to devices for realizing standard functions in the vehicle when selling the vehicle to make it possible to execute the option functions according to a request from a user after the vehicle is sold.

Japanese Patent Laid-Open No. 2021-189491 describes an information processor which changes utilization setting of an option loaded in a vehicle according to an intended purpose. In the information processor, all the options can be utilized when the intended purpose of the vehicle is business use, and utilization of at least one option is limited when the intended purpose of the vehicle is private use.

Now, in the driving assist technique, a problem is to appropriately notify a driver of failure occurrence in an in-vehicle instrument. In particular, in a vehicle loaded with an instrument for an option function which is not operated when the vehicle is sold, if the failure occurrence is notified with all the in-vehicle instruments as targets, even a failure of the in-vehicle instrument related to the option function which is not utilized is notified, causing to bother the driver.

In order to solve the above-described problem, an object of the present application is to appropriately notify failure occurrence in an in-vehicle instrument without bothering a driver in a vehicle loaded with instruments for option functions, thereby contributing to development of a sustainable transportation system.

SUMMARY OF THE INVENTION

One aspect of the present invention is a failure management device including: an information collection unit configured to collect failure information which is information about a failure of devices or instruments loaded in a vehicle; a notification unit configured to output a failure notice notifying occurrence of the failure inside the vehicle; and an instruction unit configured to instruct the notification unit whether or not to output the failure notice when the failure of one of the devices or the instruments is found based on the failure information, and the instruction unit prohibits the notification unit from outputting the failure notice when the device or the instrument in which the failure is found is not involved in execution of an option function for which the execution is permitted, based on management information indicating whether or not the execution of the option function is permitted for each of the option functions in the vehicle.

According to another aspect of the present invention, a failure management system includes a failure management device loaded in a vehicle and a management server provided outside the vehicle and communicably connected with the failure management device, the failure management device includes an information collection unit configured to collect failure information which is information about a failure of devices or instruments loaded in the vehicle and a notification unit configured to output a failure notice notifying occurrence of the failure inside the vehicle, the management server includes a first instruction unit configured to instruct the notification unit whether or not to output the failure notice when the failure of one of the devices or the instruments is found based on the failure information, the notification unit performs an output operation of the failure notice according to an instruction from the first instruction unit, and the first instruction unit prohibits the notification unit from outputting the failure notice when the device or the instrument in which the failure is found is not involved in execution of an option function for which the execution is permitted, based on management information indicating whether or not the execution of the option function is permitted for each of the option functions in the vehicle.

According to another aspect of the present invention, the failure management device further includes: a storage device configured to store the management information; and a second instruction unit configured to instruct the notification unit whether or not to output the failure notice when the failure of one of the devices or the instruments is found based on the failure information, and to prohibit the notification unit from outputting the failure notice when the device or the instrument in which the failure is found is not involved in the execution of the option function for which the execution is permitted based on the failure information stored in the storage device, and the notification unit outputs the failure notice according to the instruction from the first instruction unit when the failure management device is communicable with the management server, and outputs the failure notice according to the instruction from the second instruction unit when the failure management device is not communicable with the management server.

Another aspect of the present invention is the failure management device configuring any one of the failure management systems.

Another aspect of the present invention is a failure management method executed by a computer, the method includes: a collection step of collecting failure information which is information about a failure of devices or instruments loaded in a vehicle; an instruction step of determining an instruction on whether or not to output a failure notice notifying occurrence of the failure when the failure of one of the devices or the instruments is found based on the failure information; and a notification step of outputting the failure notice inside the vehicle according to the instruction determined by the instruction step, and in the instruction step, the instruction of prohibiting output of the failure notice is determined when the device or the instrument in which the failure is found is not involved in execution of an option function for which the execution is permitted, based on management information indicating whether or not the execution of the option function is permitted for each of the option functions in the vehicle.

According to the present invention, failure occurrence in an in-vehicle instrument can be appropriately notified without bothering a driver in a vehicle loaded with instruments for option functions.

BRIEF DESCRIPTION OF THE DRAWINGS

FIG. 3 is a diagram illustrating an example of management information;

DETAILED DESCRIPTION OF THE PREFERRED EMBODIMENTS

Hereinafter, embodiments of the present invention will be explained with reference to the drawings.

1. First Embodiment

First, a failure management device according to the first embodiment of the present invention will be explained.

Figure 1:
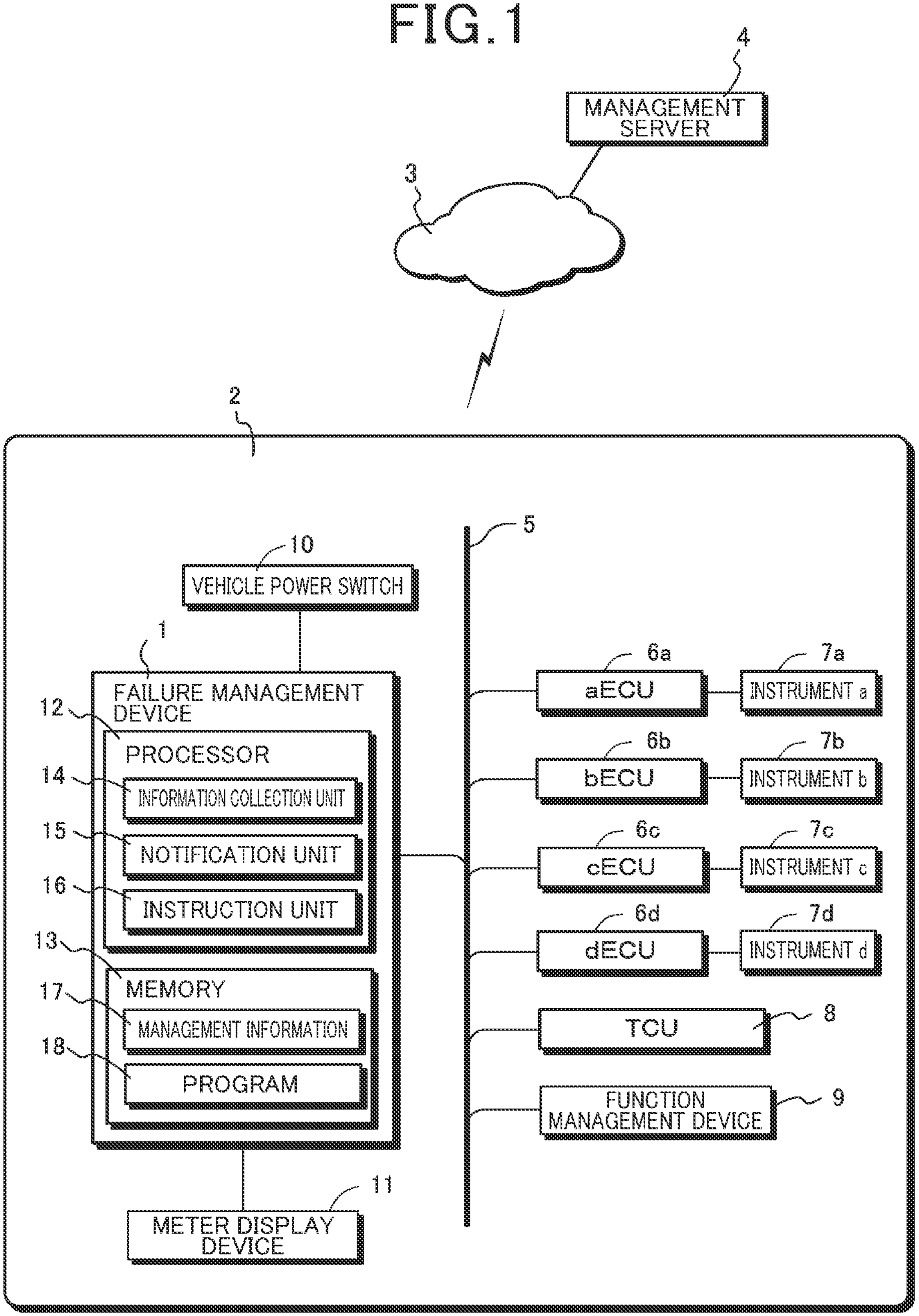
FIG. 1 is a diagram illustrating a configuration of a failure management device according to a first embodiment of the present invention.

FIG. 1 is a diagram illustrating a configuration of a failure management device 1 according to the present embodiment. The failure management device 1 is loaded in a vehicle 2, and when a failure is found in an in-vehicle instrument of the vehicle 2, outputs a failure notice indicating occurrence of the failure inside the vehicle 2. The vehicle 2 may be an arbitrary vehicle having option functions. In the present embodiment, the vehicle 2 is an electric vehicle for example.

The failure management device 1 is communicably connected with an aECU (Electronic Control Unit) 6*a*, a bECU 6*b*, a cECU 6*c*, a dECU 6*d*, a TCU (Telematics Control Unit) 8, and a function management device 9, via an in-vehicle network bus 5 provided in the vehicle 2.

The aECU 6*a*, the bECU 6*b*, the CECU 6*c* and the dECU 6*d* control an instrument a 7*a*, an instrument b 7*b*, an instrument c 7*c* and an instrument d 7*d*, respectively. Hereinafter, the aECU 6*a*, the bECU 6*b*, the cECU 6*c* and the dECU 6*d* are generically called ECUs 6 as well, and the instrument a 7*a*, the instrument b 7*b*, the instrument c 7*c* and the instrument d 7*d* are generically called instruments 7 as well. Each ECU 6 has a processor and can execute various option functions of the vehicle 2 independently or in cooperation with the other ECUs 6. Here, the ECUs 6 and the instruments 7 correspond to devices and instruments loaded in a vehicle in the present disclosure.

Each ECU 6 makes a self-diagnosis for its own operation failure and a failure diagnosis for the instrument 7 controlled by each and generates failure information indicating the diagnosis result periodically at predetermined timing for example, in a period during which a vehicle power switch 10 is in an ON state and power is supplied. Each ECU 6 transmits the generated failure information to the failure management device 1. Here, the failure may include abnormality of software and/or a failure of hardware. In addition, the failure information corresponds to failure information which is information about a failure of the devices or the instruments loaded in the vehicle in the present disclosure.

The TCU 8 includes a wireless communication device (a transmitter and a receiver) for communicating with a management server 4 provided outside the vehicle 2 via a communication network 3. The management server 4 manages information on utilization propriety of the option functions of the vehicle 2 for a user of the vehicle 2. For example, the management server 4 receives a request for utilization start or utilization stop of one of the option functions of the vehicle 2, the request being transmitted by the user via a portable terminal, and transmits an instruction of execution permission or execution prohibition of the corresponding option function to the vehicle 2. In addition, the management server 4 stores management information indicating whether or not the execution of the option function is permitted for each of the option functions in the vehicle.

The function management device 9 is an electronic controller including a computer and manages a state of execution permission/prohibition of each option function in the vehicle 2. When the instruction of the execution permission or the execution prohibition of one of the option functions is received from the management server 4, the function management device 9 gives the execution permission or instructs the execution prohibition for the option function to the ECU 6 involved in the execution of the option function.

The failure management device 1 includes a processor 12 and a memory 13. The memory 13 is configured by a volatile and/or nonvolatile semiconductor memory and/or a hard disk device or the like, for example. The memory 13 stores the management information downloaded from the management server 4 by an information collection unit 14 to be described later, as management information 17.

The processor 12 is a computer including a CPU or the like, for example. The processor 12 may include a ROM in which a program is written and a RAM or the like for temporary storage of data. Then, the processor 12 includes, as functional elements or functional units, the information collection unit 14, a notification unit 15, and an instruction unit 16.

The functional elements provided in the processor 12 are realized by the processor 12 which is the computer executing a program 18 preserved in the memory 13, for example. Note that the program 18 can be stored in a computer-readable arbitrary storage medium. Instead, all or a part of the functional elements provided in the processor 12 can be also configured by hardware including one or more electronic circuit components, respectively.

The information collection unit 14 downloads the management information from the management server 4 and stores it in the memory 13 as the management information 17. The management information is downloaded, for example, when the vehicle power switch 10 of the vehicle 2 is switched ON.

FIG. 3 is a diagram illustrating an example of the management information. In the illustrated example, the management information is illustrated in a tabular form. From the left of the illustrated table, a first column is a user ID of a vehicle user, a second column is a name of the option function, and a third column indicates information on whether or not the execution of each option function is permitted. In addition, a fourth column and a fifth column are lists of the ECUs 6 (associated ECUs) and the instruments 7 (associated instruments) involved in an operation of each option function, respectively.

Note that the information about a relationship between each option function and the associated ECUs and the associated instruments indicated by the fourth column and the fifth column does not need to be included in the management information. The information indicated in the fourth column and the fifth column may be stored in the memory 13 separately from the management information, as intrinsic information of the vehicle 2.

For example, when the vehicle 2 is a share car and the vehicle 2 can be utilized by a plurality of users, the management information may hold the information from the first column to the third column for each user U.

With reference to FIG. 1, the information collection unit 14 collects the failure information which is the information about the failure of the ECU 6 or the instrument 7. For example, the information collection unit 14 receives the failure information which is the diagnosis result of the self-diagnosis and the failure diagnosis periodically made by each ECU 6 described above, and collects the failure information.

The notification unit 15 outputs a failure notice notifying failure occurrence inside the vehicle 2 when a failure occurs in the ECU 6 or the instrument 7 based on the failure information collected by the information collection unit 14. For example, the notification unit 15 displays, as the failure notice, failure display (for example, an icon) indicating the failure occurrence at a meter display device 11 which is provided on an instrument panel (not illustrated) in interior of the vehicle 2 to display a vehicle speed or the like. In the present embodiment, in particular, the notification unit 15 outputs the failure notice according to the instruction from the instruction unit 16 to be described later. Specifically, even in a case where the failure occurs, the notification unit 15 does not output the failure notice when the output of the failure notice is prohibited from the instruction unit 16.

Figure 4:
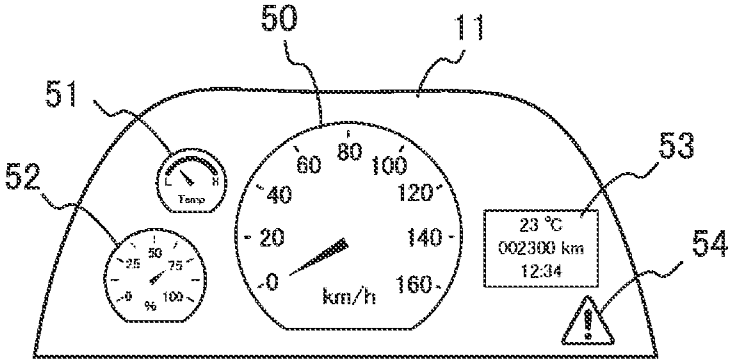
FIG. 4 is a diagram illustrating an example of output of a failure notice.

FIG. 4 is a diagram illustrating an example of the failure notice outputted using the meter display device 11. In the illustrated example, the meter display device 11 is provided with a speedometer 50, a battery thermometer 51, a battery charge remaining amount meter 52, and an information display 53 where various kinds of information are displayed. Then, the failure notice is outputted by lighting a failure display icon 54 below the information display 53 on the lower right in the illustration of the meter display device 11.

With reference to FIG. 1, the instruction unit 16 instructs the notification unit 15 whether or not to output the failure notice when the failure of one of the devices or the instruments is found based on the failure information collected by the information collection unit 14. In the present embodiment, in particular, the instruction unit 16 prohibits the notification unit 15 from outputting the failure notice when the ECU 6 or the instrument 7 in which the failure is found is not involved in the execution of the option function for which the execution is permitted based on the management information 17 stored in the memory 13.

On the other hand, when the ECU 6 or the instrument 7 in which the failure is found is involved in the execution of the option function for which the execution is permitted or is involved in standard functions (functions which are not the option functions), the instruction unit 16 permits the output of the failure notice to the notification unit 15. In response to that, the instruction unit 16 outputs the failure notice. As described above, the output of the failure notice may be the display of the failure display icon at the meter display device 11.

For example, in the case where the management information 17 has contents illustrated in FIG. 3, the bECU **6*b* or the instrument b 7*b* is not involved in any of the option functions for which the execution is permitted. Therefore, when the bECU 6*b* or the instrument b 7*b* fails, the instruction unit 16 prohibits the notification unit 15 from outputting the failure notice. On the other hand, in the management information illustrated in FIG. 3, the CECU 6*c* and the instrument c 7*c* are involved in a function F that is the option function for which the execution is permitted, the instruction unit 16 permits the output of the failure notice to the notification unit 15**.

In the failure management device 1 having the configuration described above, since the failure notice is not outputted for the failure of the in-vehicle instruments (The ECUs 6 and the instruments 7 controlled by the ECU 6 are included. The same shall apply hereinafter.) not involved in any of the option functions for which the execution is permitted and which are utilized by the vehicle user, the vehicle user is not bothered by the failure notice unrelated to himself/herself when driving the vehicle 2 as a driver.

Therefore, in the failure management device 1, the failure occurrence in the in-vehicle instrument can be appropriately notified to the driver.

Figure 2:
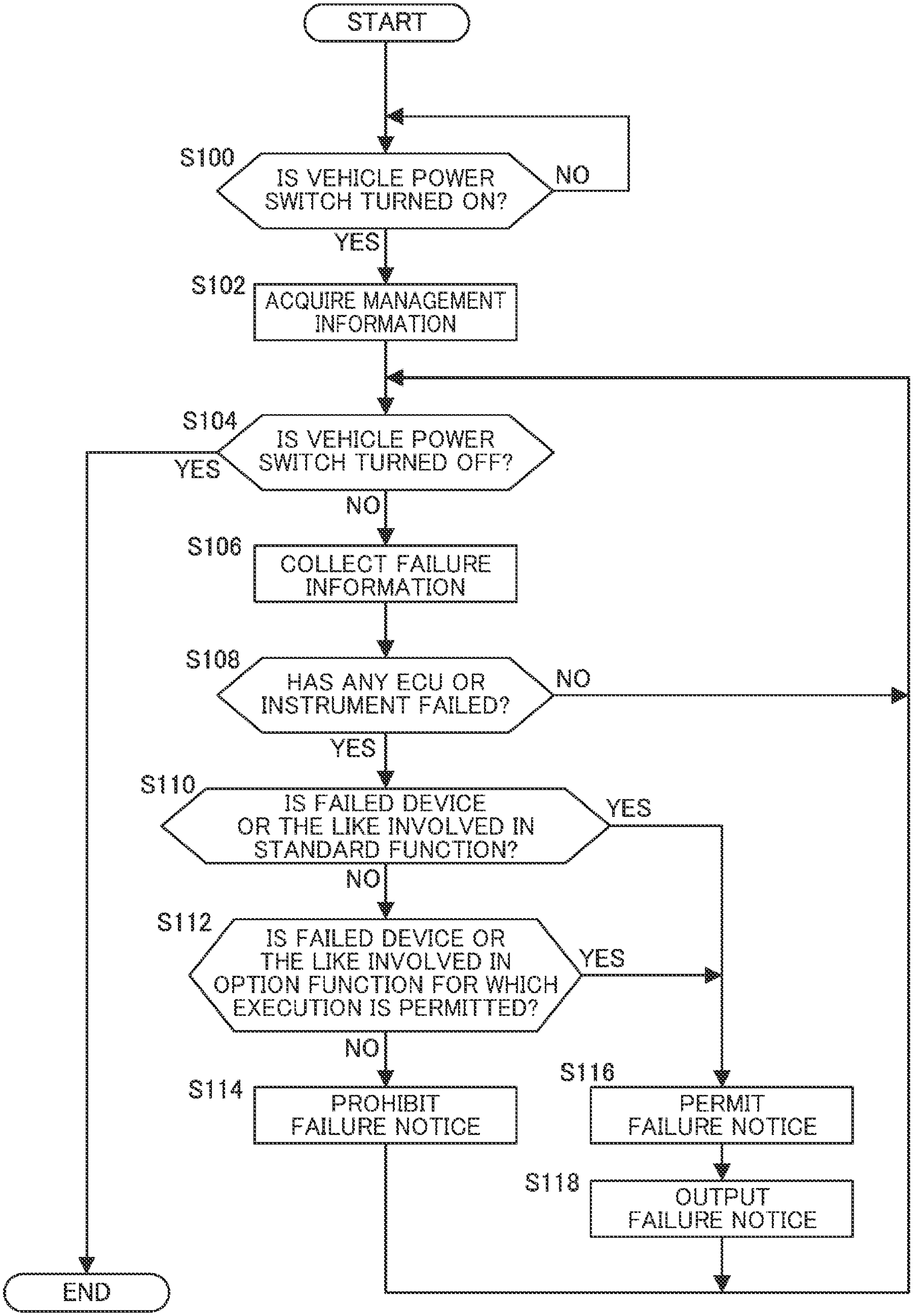
FIG. 2 is a flowchart illustrating a procedure of processing of a failure management method.

Next, a procedure of processing in the failure management device 1 will be explained. FIG. 2 is a flowchart illustrating the procedure of the processing of a failure management method executed by the processor 12 which is the computer of the failure management device. The processing illustrated in FIG. 2 is repeatedly executed.

When the processing is started, first, for example, the information collection unit 14 determines whether or not the vehicle power switch 10 is turned ON (that is, whether or not the vehicle power switch 10 is switched ON) (S100). Then, when the vehicle power switch 10 is not turned ON (S100, NO), the information collection unit 14 returns to step S100 to repeat the processing and stands by for the vehicle power switch 10 to be turned ON.

On the other hand, when the vehicle power switch 10 is turned ON (S100, YES), the information collection unit 14 acquires the management information from the management server 4 (S102). The information collection unit 14 stores the acquired management information in the memory 13 as the management information 17. Subsequently, the information collection unit 14 determines whether or not the vehicle power switch 10 is turned OFF (S104). Then, when the vehicle power switch 10 is turned OFF (S104, YES), the information collection unit 14 ends the present processing.

On the other hand, when the vehicle power switch 10 is not turned OFF (S104, NO), the information collection unit 14 collects the failure information from each ECU 6 (S106). Specifically, the information collection unit 14 collects the failure information by receiving the failure information transmitted periodically from each ECU 6. Subsequently, the notification unit 15 determines whether or not the failure has occurred in one of the ECUs 6 or the instruments 7 based on the failure information collected by the information collection unit 14 (S108).

Then, when the failure has not occurred in any of the ECUs 6 and the instruments 7 (S108, NO), the notification unit 15 returns to step S104 to repeat the processing. On the other hand, when the failure has occurred in one of the ECUs 6 or the instruments 7 (S108, YES), the notification unit 15 notifies the instruction unit 16 of that fact. The instruction unit 16 which receives the notice first determines whether or not a failed device or the like (the ECU 6 and/or the instrument 7 in which the failure has occurred) is involved in the standard functions (the functions other than the option functions) (S110). For example, the instruction unit 16 may refer to a list (not illustrated) of the ECUs 6 and the instruments 7 involved in the standard functions, the list being stored in the memory 13 beforehand, and make determination in step S110.

Then, when the failed device or the like is involved in the standard functions (S110, YES), the instruction unit 16 permits the output of the failure notice to the notification unit 15 (S116). In response to the permission, the notification unit 15 outputs the failure notice (S118) and then returns the processing to step S104.

On the other hand, when the failed device or the like is not involved in the standard functions in step S110 (S110, NO), the instruction unit 16 determines whether or not the failed device or the like is involved in the option function for which the execution is permitted (S112). Then, when the failed device or the like is involved in the option function for which the execution is permitted (S112, YES), the instruction unit 16 shifts the processing to step S116, and permits the output of the failure notice.

On the other hand, when the failed device or the like is not involved in the option function for which the execution is permitted (S112, NO), the instruction unit 16 prohibits the notification unit 15 from outputting the failure notice (S114) and then returns the processing to step S104.

Here, in the flowchart illustrated in FIG. 2, step S106 corresponds to a collection step in the present disclosure and step S118 corresponds to a notification step in the present disclosure. In addition, steps S110, S112, S114 and S116 correspond to an instruction step in the present disclosure.

2. Second Embodiment

Next, a failure management system according to the second embodiment of the present invention will be explained.

Figure 5:
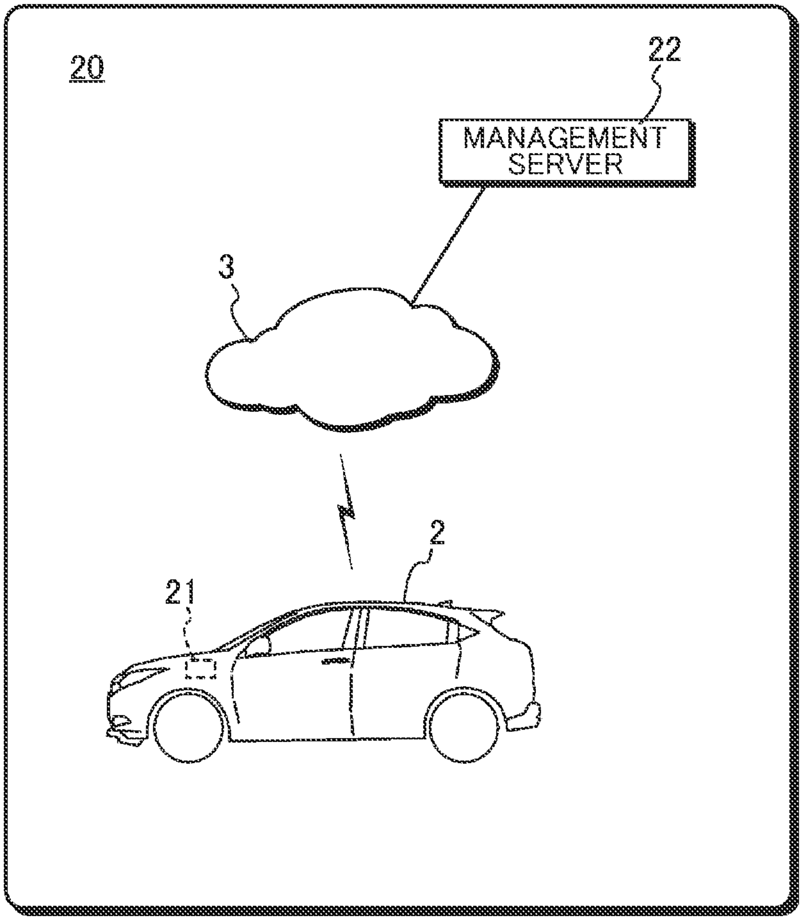
FIG. 5 is a diagram illustrating the configuration of a failure management system according to a second embodiment of the present invention.

FIG. 5 is a diagram illustrating the configuration of a failure management system 20 according to the present embodiment. The failure management system 20 illustrated in FIG. 5 includes a failure management device 21 loaded in the vehicle 2, and a management server 22. The failure management device 21 and the management server 22 are communicably connected via the communication network 3. In the failure management system 20, when the failure of the device or the instrument loaded in the vehicle 2 is found, the failure management device 21 receives the instruction on whether or not to output the failure notice for the found failure from the management server 22, and performs the operation according to the received instruction.

According to the failure management system 20 according to the present embodiment, in addition to an effect in the first embodiment that the driver is not bothered by prohibiting the failure notice unrelated to the driver, the failure occurrence in the in-vehicle instrument can be appropriately notified to the driver while managing latest information of option function utilization in the management server 22 and reducing processing loads of the failure management device 21 loaded in the vehicle for example.

2.1 Configuration of Failure Management Device

Figure 6:
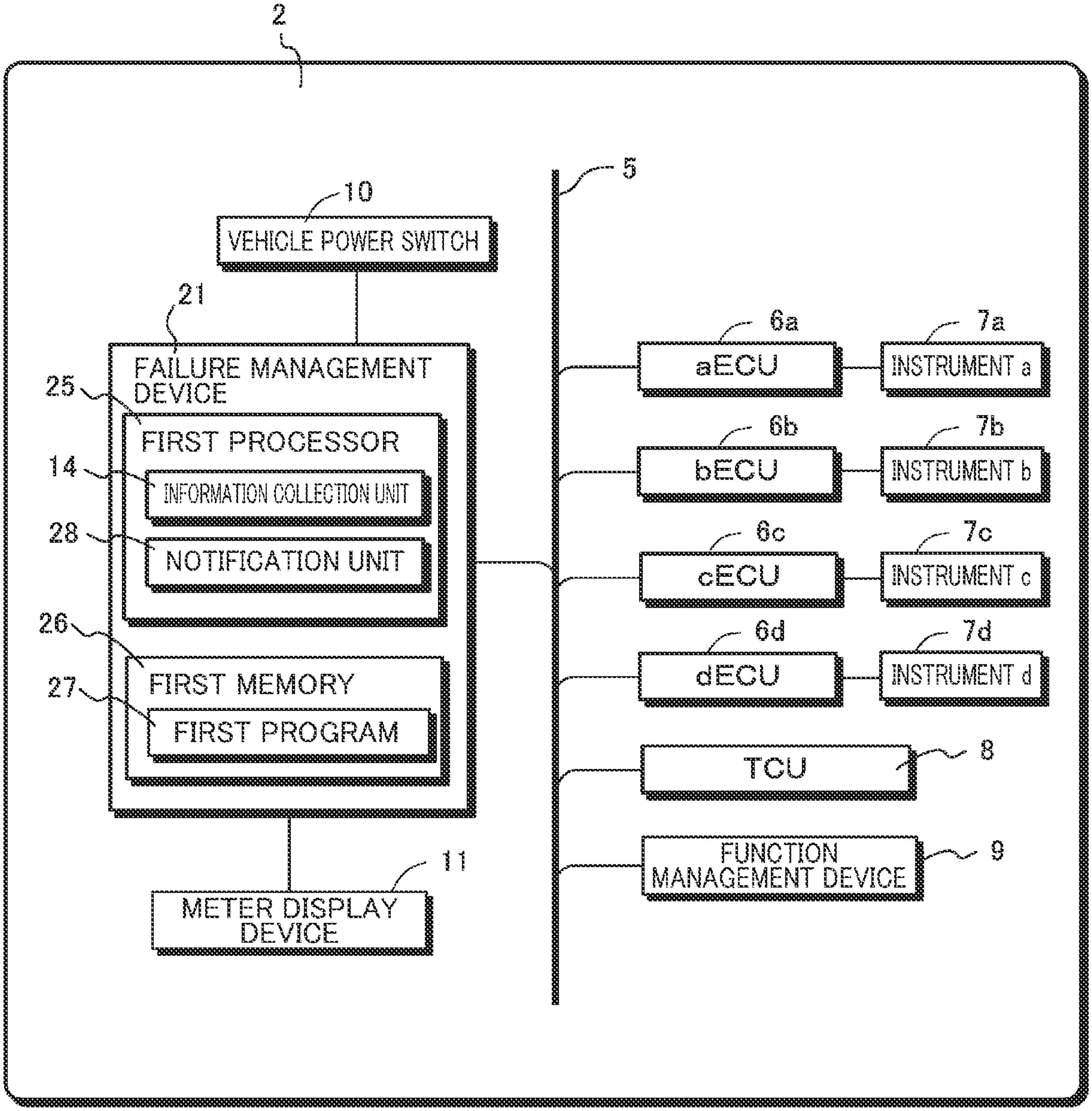
FIG. 6 is a diagram illustrating the configuration of the failure management device configuring the failure management system illustrated in FIG. 5.

FIG. 6 is a diagram illustrating the configuration of the failure management device 21 configuring the failure management system 20. In FIG. 6, for components same as that of the failure management device 1 according to the first embodiment illustrated in FIG. 1, signs same as the signs in FIG. 1 are used and the explanation for FIG. 1 described above is applied.

The failure management device 21 has the configuration similar to that of the failure management device 1, but is different in that a first processor 25 and a first memory 26 are provided instead of the processor 12 and the memory 13. The first memory 26 has the configuration similar to that of the memory 13, but is different in that the management information 17 is not stored and a first program 27 is stored instead of the program 18.

The first processor 25 has the configuration similar to that of the processor 12, but is different in that the instruction unit 16 is not provided and a notification unit 28 is provided instead of the notification unit 15 as the functional element or the functional unit. The functional elements provided in the first processor 25 are realized by the first processor 25 which is the computer executing the first program 27 preserved in the first memory 26, for example.

Note that the first program 27 can be stored in a computer-readable arbitrary storage medium. Instead, all or a part of the functional elements provided in the first processor 25 can be also configured by hardware including one or more electronic circuit components, respectively.

The notification unit 28 has the configuration similar to that of the notification unit 15, but follows the instruction from an instruction unit 36 of the management server 22 to be described later instead of the instruction from the instruction unit 16 regarding whether or not to output the failure notice.

Specifically, the notification unit 28 transmits an instruction request requesting the instruction on whether or not to output the failure notice to the management server 22 when the failure occurs in the ECU 6 or the instrument 7 based on the failure information collected by the information collection unit 14. The instruction request may include instrument information for specifying the ECU 6 and/or the instrument 7 in which the failure has occurred.

The instruction unit 36 (to be described later) of the management server 22 which receives the instruction request determines whether or not to output the failure notice based on the instrument information included in the instruction request. Then, the instruction of notice permission or notice prohibition as the determination result is transmitted to the failure management device 21. The notification unit 28 outputs the failure notice according to the instruction from the instruction unit 36 of the management server 22. Specifically, the notification unit 28 outputs the failure notice for the failure when the instruction of the notice permission is received from the instruction unit 36 of the management server 22, and does not output the failure notice for the failure when the instruction of the notice prohibition is received. Note that the failure may be notified by displaying the failure display icon at the meter display device 11 similarly to the first embodiment.

2.2 Configuration of Management Server

Figure 7:
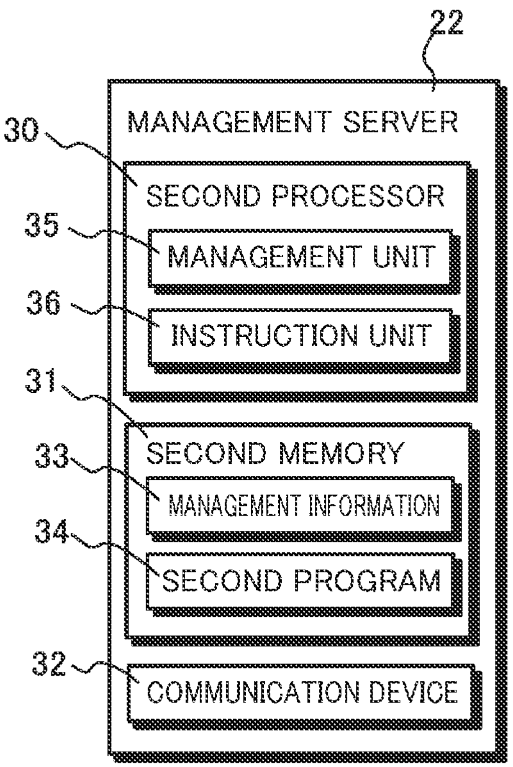
FIG. 7 is a diagram illustrating the configuration of a management server configuring the failure management system illustrated in FIG. 5.

Next, the management server 22 will be explained. FIG. 7 is a diagram illustrating the configuration of the management server 22. The management server 22 includes a second processor 30, a second memory 31, and a communication device 32. The communication device 32 is a communication device for the management server 22 to communicate with the failure management device 21 via the communication network 3.

The second memory 31 is configured by a volatile and/or nonvolatile semiconductor memory and/or a hard disk device or the like, for example. In the second memory 31, management information 33 is stored by a management unit 35 to be described later. The management information 33 is the information indicating whether or not the execution of the option function is permitted for each of the option functions in the vehicle 2, and is the same as the management information 17 (for example, the management information illustrated in FIG. 3) stored in the memory 13 of the failure management device 1 in the first embodiment.

The second processor 30 is a computer including a CPU or the like, for example. The second processor 30 may include a ROM in which a program is written and a RAM or the like for temporary storage of data. Then, the second processor 30 includes, as functional elements or functional units, the management unit 35 and the instruction unit 36.

The functional elements provided in the second processor 30 are realized by the second processor 30 which is the computer executing a second program 34 preserved in the second memory 31, for example. Note that the second program 34 can be stored in a computer-readable arbitrary storage medium. Instead, all or a part of the functional elements provided in the second processor 30 can be also configured by hardware including one or more electronic circuit components, respectively.

The management unit 35 manages the information of the utilization propriety of the option functions of the vehicle 2 for the user of the vehicle 2. For example, the management unit 35 receives the request for the utilization start or the utilization stop of one of the option functions of the vehicle 2, the request being transmitted by the user via a portable terminal or the like, and transmits the instruction of the execution permission or the execution prohibition of the corresponding option function to the vehicle 2. In addition, the management unit 35 generates the management information 33 indicating whether or not the execution of the option function is permitted for each of the option functions in the vehicle and stores the management information 33 in the second memory 31.

The instruction of the execution permission or the execution prohibition from the management unit 35 is received by the function management device 9 of the vehicle 2. As described above in the explanation of the first embodiment, the function management device 9 gives the execution permission or instructs the execution prohibition for the option function to the ECU 6 involved in the execution of the option function when the instruction of the execution permission or the execution prohibition of one of the option functions is received.

When the instruction request is received from the failure management device 21, the instruction unit 36 instructs the notification unit 28 of the failure management device 21 whether or not to output the failure notice for the ECU 6 or the instrument 7 specified by the instrument information included in the instruction request (that is, the ECU 6 or the instrument 7 in which the failure is found).

Specifically, the instruction unit 36 transmits the instruction of the notice prohibition to the notification unit 28 of the failure management device 21 and prohibits the output of the failure notice when the ECU 6 or the instrument 7 specified by the instrument information is not involved in the execution of the option function for which the execution is permitted based on the management information 33 stored in the second memory 31.

On the other hand, when the ECU 6 or the instrument 7 specified by the instrument information is involved in the execution of the option function for which the execution is permitted or is involved in the standard functions (the functions which are not the option functions), the instruction unit 36 transmits the notice permission to the notification unit 28 of the failure management device 21 and instructs the output of the failure notice.

Next, the failure management method executed by the failure management system 20 will be explained. The failure management method executed by the first processor 25 of the failure management device 21 and the second processor 30 of the management server 22, which are the computers of the failure management system 20, is similar to the failure management method executed by the failure management device 1 according to the first embodiment illustrated in FIG. 2. However, the failure management method in the failure management system 20 is different in that the management unit 35 of the management server 22 generates the management information 33 instead of step S106, and an execution subject of steps S110, S112, S114 and S116 is the instruction unit 36 of the management server 22 instead of the instruction unit 16.

3. Third Embodiment

Next, the failure management system according to the third embodiment of the present invention will be explained.

Figure 8:
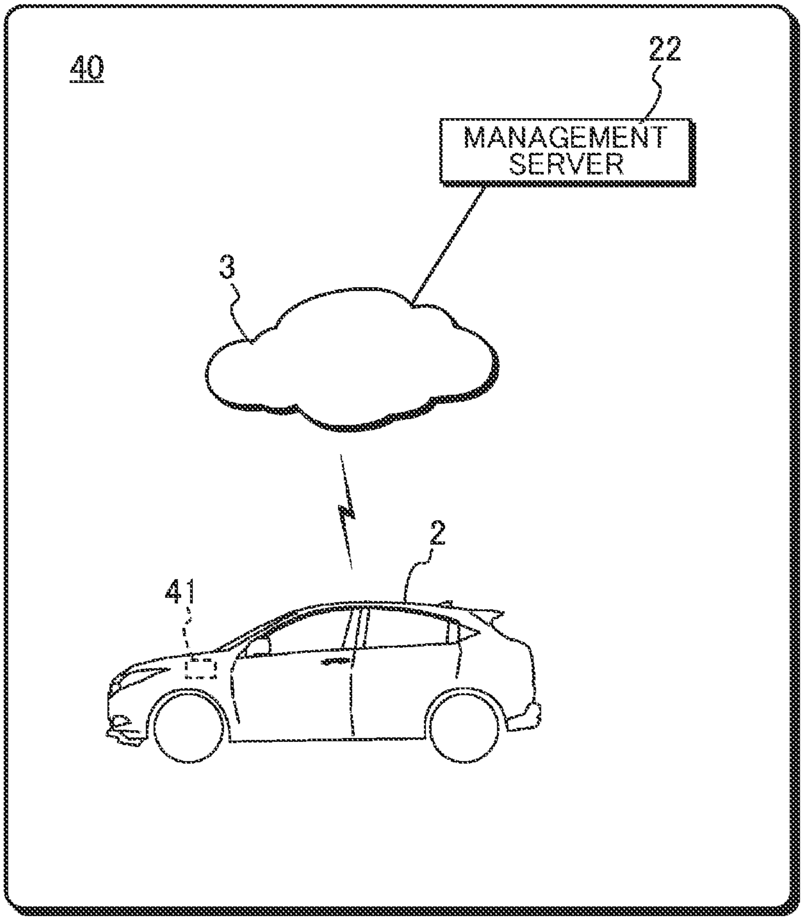
FIG. 8 is a diagram illustrating the configuration of the failure management system according to a third embodiment of the present invention.

FIG. 8 is a diagram illustrating the configuration of a failure management system 40 according to the present embodiment. In FIG. 8, for the components same as that of the failure management system 20 according to the second embodiment illustrated in FIG. 5, the signs same as the signs in FIG. 5 are used and the explanation for FIG. 5 described above is applied.

The failure management system 40 illustrated in FIG. 8 has the configuration similar to that of the failure management system 20 illustrated in FIG. 5, but is different in that a failure management device 41 is provided instead of the failure management device 21.

Figure 9:
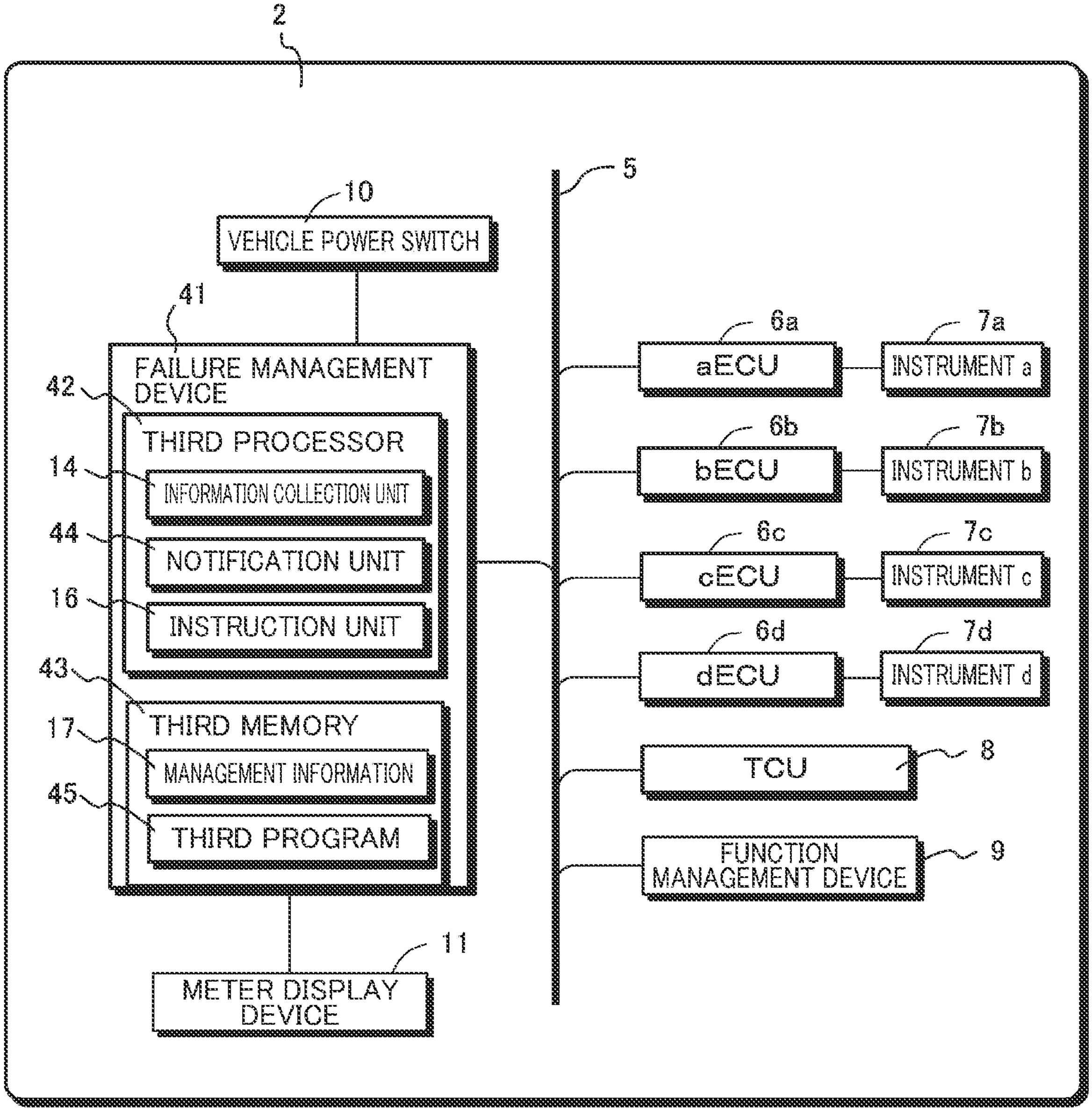
FIG. 9 is a diagram illustrating the configuration of the failure management device configuring the failure management system illustrated in FIG. 8.

FIG. 9 is a diagram illustrating the configuration of the failure management device 41. In FIG. 9, for the components same as that of the failure management device 1 according to the first embodiment illustrated in FIG. 1, the signs same as the signs in FIG. 1 are used and the explanation for FIG. 1 described above is applied.

The failure management device 41 has the configuration similar to that of the failure management device 1 illustrated in FIG. 1, but is different in that a third processor 42 and a third memory 43 are provided instead of the processor 12 and the memory 13. The third memory 43 is configured by, similarly to the memory 13, a volatile and/or nonvolatile semiconductor memory and/or a hard disk device or the like, for example. Similarly to the memory 13, the third memory 43 stores the management information downloaded from the management server 4 by the information collection unit 14 as the management information 17. Here, the third memory 43 corresponds to a storage device which stores the management information in the present disclosure.

The third processor 42 has the configuration similar to that of the processor 12, but is different in that a notification unit 44 is provided instead of the notification unit 15 as the functional element or the functional unit. The functional elements provided in the third processor 42 are realized by the third processor 42 which is the computer executing a third program 45 preserved in the third memory 43, for example.

Note that the third program 45 can be stored in a computer-readable arbitrary storage medium. Instead, all or a part of the functional elements provided in the third processor 42 can be also configured by hardware including one or more electronic circuit components, respectively.

The notification unit 44 has the configuration similar to that of the notification unit 15 of the failure management device 1 illustrated in FIG. 1, but is different from the notification unit 15 in that the notification unit 44 outputs the failure notice according to the instruction from the instruction unit 16 or outputs the failure notice according to the instruction from the instruction unit 36 of the management server 22 depending on whether or not communication between the failure management device 41 and the management server 22 is possible. Specifically, the notification unit 44 outputs the failure notice according to the instruction from the instruction unit 16 when the failure management device 41 is not communicable with the management server 22, and outputs the failure notice according to the instruction from the instruction unit 36 of the management server 22 when the failure management device 41 is communicable with the management server 22.

Here, in the present embodiment, the instruction unit 36 provided in the management server 22 corresponds to a first instruction unit in the present disclosure, and the instruction unit 16 provided in the failure management device 41 corresponds to a second instruction unit in the present disclosure.

In the failure management system 40 having the configuration described above, regardless of a communication state of the vehicle 2 and the management server 22, the failure occurrence in the in-vehicle instrument can be appropriately notified to the driver.

Next, the failure management method executed by the failure management system 40 will be explained. The failure management method executed by the third processor 42 of the failure management device 41 and the second processor 30 of the management server 22, which are the computers of the failure management system 40, is similar to the failure management method executed by the failure management device 1 according to the first embodiment illustrated in FIG. 2. However, the failure management method in the failure management system 40 is different in that the management unit 35 of the management server 22 generates the management information 33 instead of step S106, and the execution subject of steps S110, S112, S114 and S116 is the instruction unit 16 of the failure management device 41 or the instruction unit 36 of the management server 22 depending on whether or not the communication between the failure management device 41 and the management server 22 is possible.

4. Other Embodiments

In the embodiments described above, the information collection unit 14 collects the failure information by receiving the failure information transmitted periodically by each ECU 6. In addition, the information collection unit 14 may determine whether or not each ECU 6 has transmitted the failure information periodically at an interval of predetermined time or shorter and acquire the determination result as the failure information. Alternatively, the information collection unit 14 may transmit a response request to each ECU 6 periodically at predetermined timing, determine whether or not each ECU 6 has returned an answer response within the predetermined time and acquire the determination result as the failure information.

In the second embodiment or the third embodiment described above, the management server 22 may store the management information 33 for each of a plurality of vehicles 2 and transmit the instruction on whether or not to give the failure notice to the failure management device 21 or 41 of the plurality of vehicles 2. In this case, when each vehicle 2 is a share car utilized by the plurality of users, the management unit of the management server 22 can create and store the management information 33 for each combination of the user and the vehicle 2. In this case, the management server 22 can receive the instruction request including a vehicle ID of the vehicle 2 and the user ID of the user utilizing the vehicle 2 at the current time further from the failure management device 21 or 41 of each vehicle 2. The instruction unit 36 of the management server 22 can determine output permission/prohibition of the failure notice by referring to the management information 33 corresponding to the combination of the vehicle ID and the user ID included in the instruction request, and transmit the determination result to the failure management device 21 or 41 of the corresponding vehicle 2.

Note that the present invention is not limited to the configurations of the embodiments described above, and can be implemented in various modes without deviating from the gist.

5. Configurations Supported by Embodiments Described Above

The embodiments described above support the following configurations.

(Configuration 1) A failure management device including: an information collection unit configured to collect failure information which is information about a failure of devices or instruments loaded in a vehicle; a notification unit configured to output a failure notice notifying occurrence of the failure inside the vehicle; and an instruction unit configured to instruct the notification unit whether or not to output the failure notice when the failure of one of the devices or the instruments is found based on the failure information, wherein the instruction unit prohibits the notification unit from outputting the failure notice when the device or the instrument in which the failure is found is not involved in execution of an option function for which the execution is permitted, based on management information indicating whether or not the execution of the option function is permitted for each of the option functions in the vehicle.

According to the failure management device of configuration 1, since the failure notice is not outputted for the failure of the in-vehicle instruments (including the devices and the instruments controlled by the devices) not involved in any of the option functions for which the execution is permitted and which are utilized by the vehicle user, the vehicle user is not bothered by the failure notice unrelated to himself/herself when driving the vehicle as a driver. Therefore, in the failure management device of configuration 1, the failure occurrence in the in-vehicle instrument can be appropriately notified to the driver.

(Configuration 2) A failure management system including a failure management device loaded in a vehicle and a management server provided outside the vehicle and communicably connected with the failure management device, wherein the failure management device includes an information collection unit configured to collect failure information which is information about a failure of devices or instruments loaded in the vehicle, and a notification unit configured to output a failure notice notifying occurrence of the failure inside the vehicle, the management server includes a first instruction unit configured to instruct the notification unit whether or not to output the failure notice when the failure of one of the devices or the instruments is found based on the failure information, the notification unit performs an output operation of the failure notice according to an instruction from the first instruction unit, and the first instruction unit prohibits the notification unit from outputting the failure notice when the device or the instrument in which the failure is found is not involved in execution of an option function for which the execution is permitted, based on management information indicating whether or not the execution of the option function is permitted for each of the option functions in the vehicle.

According to the failure management system of configuration 2, the failure occurrence in the in-vehicle instrument can be appropriately notified to the driver without bothering the driver by prohibiting the failure notice unrelated to the driver, while managing the latest information of option function utilization in the management server and reducing processing loads of the failure management device loaded in the vehicle for example.

(Configuration 3) The failure management system according to configuration 2, wherein the failure management device further includes: a storage device configured to store the management information; and a second instruction unit configured to instruct the notification unit whether or not to output the failure notice when the failure of one of the devices or the instruments is found based on the failure information, and to prohibit the notification unit from outputting the failure notice when the device or the instrument in which the failure is found is not involved in the execution of the option function for which the execution is permitted, based on the failure information stored in the storage device, and the notification unit outputs the failure notice according to the instruction from the first instruction unit when the failure management device is communicable with the management server, and outputs the failure notice according to the instruction from the second instruction unit when the failure management device is not communicable with the management server.

According to the failure management system of configuration 3, regardless of a communication state of the vehicle and the management server, the failure occurrence in the in-vehicle instrument can be appropriately notified to the driver.

(Configuration 4) The failure management device configuring the failure management system according to configuration 2 or 3.

According to the failure management device of configuration 4, the failure occurrence in the in-vehicle instrument can be appropriately notified to the driver by cooperating with the management server for the latest information of the option function utilization for example.

(Configuration 5) A failure management method executed by a computer, the method including: a collection step of collecting failure information which is information about a failure of devices or instruments loaded in a vehicle; an instruction step of determining an instruction on whether or not to output a failure notice notifying occurrence of the failure when the failure of one of the devices or the instruments is found based on the failure information; and a notification step of outputting the failure notice inside the vehicle according to the instruction determined by the instruction step, wherein, in the instruction step, the instruction of prohibiting output of the failure notice is determined when the device or the instrument in which the failure is found is not involved in execution of an option function for which the execution is permitted, based on management information indicating whether or not the execution of the option function is permitted for each of the option functions in the vehicle.

According to the failure management method of configuration 5, since the failure notice is not outputted for the failure of the in-vehicle instrument not involved in any of the option functions for which the execution is permitted and which are utilized by the vehicle user, the vehicle user is not bothered by the failure notice unrelated to himself/herself when driving the vehicle as a driver. Therefore, in the failure management device of configuration 1, the failure occurrence in the in-vehicle instrument can be appropriately notified to the driver.

REFERENCE SIGNS LIST 1, 21, 41 . . . function management system, 2 . . . vehicle, 3 . . . communication network, 4, 22 . . . management server, 5 . . . in-vehicle network bus, 6 . . . ECU, *6a* . . . aECU, *6b* . . . bECU, *6c* . . . CECU, *6d* . . . dECU, 7 . . . instrument, *7a* . . . instrument a, *7b* . . . instrument b, *7c* . . . instrument c, *7d* . . . instrument d, 8 . . . TCU, 9. . . function management device, 10 . . . vehicle power switch, 11. . . meter display device, 12 . . . processor, 13. . . memory, 14 . . . information collection unit, 15, 28, 44. . . notification unit, 16, 36 . . . instruction unit, 17, 33 . . . management information, 18 . . . program, 20, 40 . . . failure management system, 25 . . . first processor, 26 . . . first memory, 27. . . first program, 30 . . . second processor, 31. . . second memory, 32 . . . communication device, 35. . . management unit, 42 . . . third processor, 43 . . . third memory, 45 . . . third program, 50 . . . speedometer, 51 . . . battery thermometer, 52 . . . battery charge remaining amount meter, 53 . . . information display, 54 . . . failure display icon.

What is claimed is:

1. A failure management system comprising a failure management device loaded in a vehicle and a management server provided outside the vehicle and communicably connected via a communication network with the failure management device, wherein the failure management device includes a processor, wherein the processor is configured to collect failure information which is information about a failure of devices or instruments loaded in the vehicle, and output a failure notice notifying occurrence of the failure inside the vehicle, the management server configured to store, in a memory, management information indicating whether or not execution of each of a plurality of option functions of the vehicle is permitted or not, and receive request for utilization start or utilization stop of each of option functions that is transmitted by a user of the vehicle via a portable terminal, transmit an instruction of execution permission or execution prohibition of the corresponding option function, and update the management information, wherein the processor of the failure management device is configured to determine, based on the instruction of execution permission or execution prohibition of each of option functions received from the management server, whether or not to output the failure notice when the failure of one of the devices or the instruments is found based on the failure information, and prohibit outputting the failure notice when the device or the instrument in which the failure is found is not involved in execution of the option function for which the execution is permitted.

2. The failure management system according to claim 1, wherein the failure management device includes a second memory that receives the management information from the management server and stores the management information, the processor determines whether or not to output the failure notice based on the instruction to permit execution or prohibit execution of each of option functions received from the management server when communicable with the management server, and determines whether or not to output the failure notice based on the management information stored in the second memory when not communicable with the management server.

3. The failure management device configuring the failure management system according to claim 2.

4. A failure management method executed by a processor of a computer, the method comprising:

a step of communicating between a failure management device loaded in a vehicle and a management server provided outside the vehicle and communicably connected via a communication network with the failure management device;

a collection step of collecting failure information which is information about a failure of devices or instruments loaded in a vehicle;

a step of receiving request for utilization start or utilization stop of each of option functions that is transmitted by a user of the vehicle via a portable terminal, transmitting an instruction of execution permission or execution prohibition of the corresponding option function, and storing management information indicating whether or not execution of the option function of the vehicle is permitted or not in a memory;

a step of determining, based on the instruction of execution permission or execution prohibition of each of option functions received from the management server, whether or not to output a failure notice notifying occurrence of the failure when the failure of one of the devices or the instruments is found based on the failure information; and a notification step of outputting the failure notice determined to output inside the vehicle, wherein, in the step of determining whether or not to output the failure notice, output of the failure notice is prohibited when the device or the instrument in which the failure is found is not involved in execution of the option function for which the execution is permitted.

* * * * *